Jan. 29, 1963

L. B. PENLAND 3,075,414

DIAPHRAGM CLAMPING DEVICE

Filed Feb. 23, 1961

INVENTOR:
Lowell B. Penland
BY
Wupper, Gradolph & Love
Attys

Jan. 29, 1963 L. B. PENLAND 3,075,414
DIAPHRAGM CLAMPING DEVICE
Filed Feb. 23, 1961 2 Sheets-Sheet 2
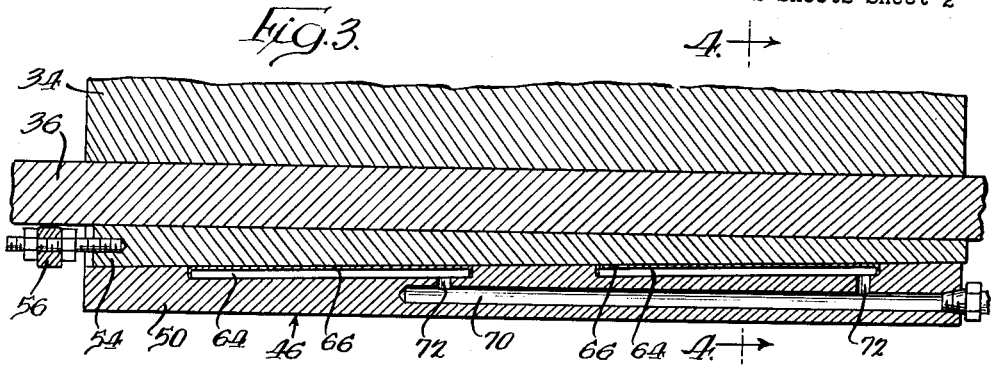
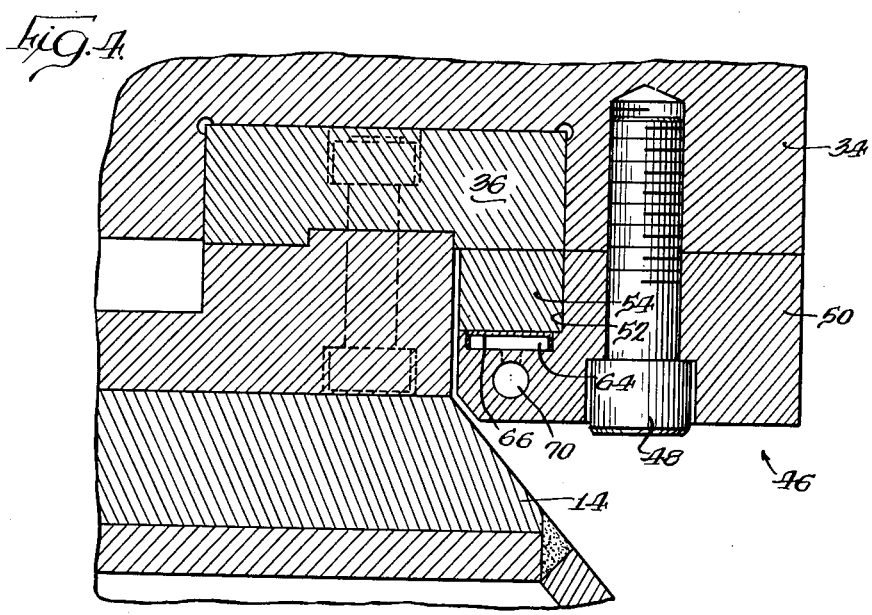
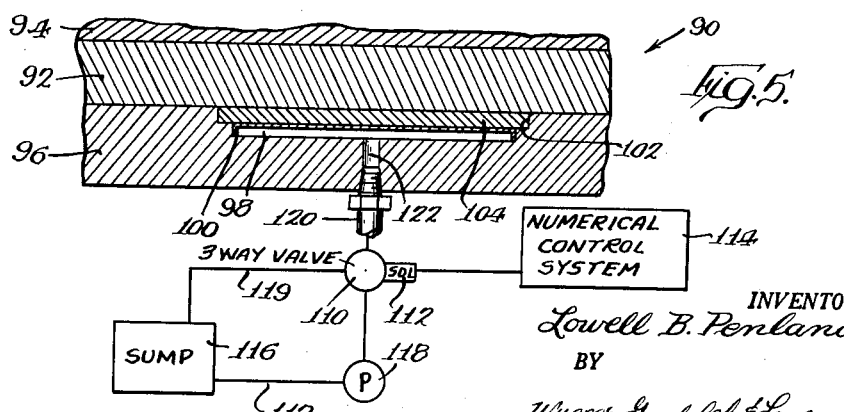
INVENTOR:
Lowell B. Penland
BY
Wupper, Bradolph & Love
Attys

United States Patent Office 3,075,414
Patented Jan. 29, 1963

3,075,414
DIAPHRAGM CLAMPING DEVICE
Lowell B. Penland, Richmond, Ind., assignor to National Automatic Tool Company, Inc., Richmond, Ind., a corporation of Indiana
Filed Feb. 23, 1961, Ser. No. 91,062
10 Claims. (Cl. 77—32.2)

This invention relates generally to machine tools and more specifically to an improved positive clamping device for locking the work and tool carrying members of a machine tool in the positions to which they are moved for operation of the tool on the work.

In typical machine tools, such as single spindle drill presses and the like, a work carrying table is usually moved along ways in either of two horizontal directions normal to each other to a predetermined position in which the work will be subjected to a machining operation and a head which carries a tool, for example, a drill, is moved in a vertical direction to a predetermined start position above the work. During the machining operation, the table and in some machines the head must be maintained in their predetermined positions, and in the typical machine this is usually accomplished by means of well known devices which mechanically resemble C clamps.

This involves some manual intervention in the machining operation and as a result slows down the operation of the machine, particularly if the machine is of the type which is automatically indexed under the control of a tape or the like such as those shown in United States Patent No. 2,876,650, issued March 10, 1959, to Arlon G. Sangster, and copending United States patent application of Virgil E. Tice, Serial No. 678,597, filed August 16, 1957, now abandoned. The undesirable loss in machine time is even more critical in machines of the type shown in said patent and application when they are modified to incorporate an automatic tool changing arrangement as suggested in United States Patent No. 2,901,927, issued September 1, 1959, to Mark Morgan. In these highly automatic machine tools, the repetitive loss of even a few seconds incurs a severe cost-of-operating penalty. The disclosures of the patents are incorporated herein by reference to the same extent as though they were set forth in detail herein.

The known clamping devices are also bulky, slow acting and subject to considerable wear and mechanical adjustment and also require the application of substantial forces to small clamp areas and substantial movement of the clamping device. Even more important is the problem created by scoring of the surfaces engaged by the present commercial clamps. For example, when a screw on the clamping device is used to apply a clamping force to the work supporting table, a mark is frequently left on the table surface engaged by the screw. Over a long period of machine use, the screw will leave innumerable closely adjacent scoring marks; and frequently the screw in clamping the table will "ride on" the sloping surface of a mark to apply a force component normal to the direction of the clamping force to "cam" the table along the ways until the play between the table and its drive means is taken up, whereby slight mispositioning of the work results.

It is therefore a principal object of the present invention to provide in a machine tool of the type described an improved device for accurately clamping the work and tool supporting members in selected positions, which device has a substantial clamping force, yet which is very compact and simple without mechanical parts which get out of order. In the preferred embodiment, this is accomplished by means of a very simple diaphragm clamping device which has a substantial clamping area subjected to hydraulic pressure whereby relatively high clamping forces may be applied with only low pressures. Because of the wide and even distribution of force by the clamping diaphragm, deflection of the clamped members is minimized.

Another object is to provide an improved clamping device of the type described in which a wear shoe or other wear member is interposed between the clamping diaphragm and the members being clamped, whereby wear on the active member—i.e., the diaphragm—is substantially eliminated.

Another object is to control the diaphragm clamping device of the type described above by means of a simple hydraulic pressure controlling valve operated under control of the numerical control tape which controls the positioning of the work and tool carrying members. By means of this feature the clamping action is synchronized with the work and tool positioning steps for minimum loss in machine time. Because the clamping action requires merely the application of a hydraulic force and because very little movement of hydraulic fluid is required, the clamping action is very rapid.

Other objects and advantages of the present invention will become apparent from the following description taken in conjunction with the accompanying drawings in which:

FIG. 3 is a fragmentary sectional view taken substantially along line 3—3 of FIG. 2 looking in the direction of the arrows showing the improved clamping device of the present invention applied to a gib which urges a slide against a way for clamping action between the latter two;

FIG. 4 is an enlarged fragmentary sectional elevation view taken substantially along line 4—4 of FIG. 3 looking in the direction of the arrows; and FIG. 5 is a view partially in section illustrating another embodiment of the improved clamping device of the present invention and partially diagrammatic illustrating the control of the improved clamping device by a numerical control system.

Figure 1:
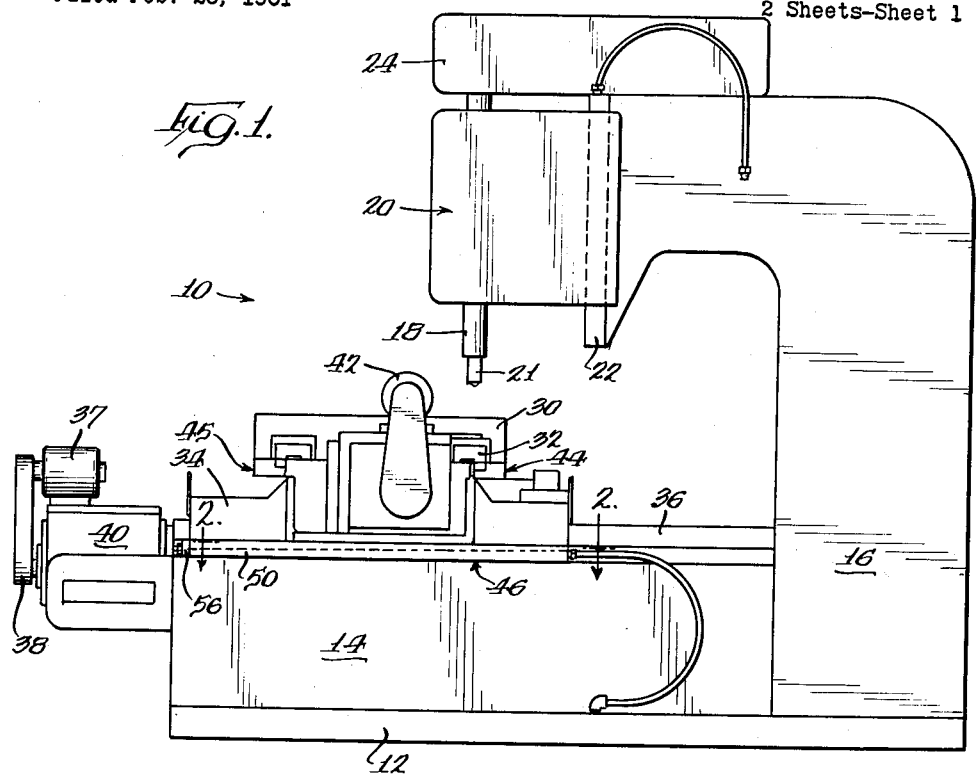
FIG. 1 is a side elevational view of a representative machine tool with which the improved clamping device of the present invention may be used.

The single spindle drill press of FIG. 1 illustrates one type of machine with which the present improved clamping device may be utilized to great advantage. It will be appreciated, however, that the invention is not limited to its use on this type of machine and that the invention is to be limited only to the scope of the appended claims.

The drill press 10 of FIG. 1 includes a sub-base 12 which rests in a well known manner upon a supporting floor structure and which carries a supporting base 14 and a column 16. A suitable spindle 18 which carries a tool 21 is rotatably mounted in a head or slide 20 which is movable vertically in either direction on the column 16. The head 20 is reciprocably carried and guided on ways 22 carried by the column, and a spindle motor and gear mechanism are mounted in a suitable housing 24.

A table or slide 30 is mounted on ways 32 supported on a saddle or slide 34 for reciprocable movement normal to the plane of the paper in FIG. 1. The saddle 34 is carried by ways 36 for horizontal reciprocable movement in the plane of the paper in FIG. 1. The ways 36 are suitably secured to the supporting base 14.

The saddle 34 is moved by a suitable mechanism driven by a motor 37, which through a belt 38 and a suitable transmission 40 drives a feed screw (not shown) coupled to the saddle. The table 30 is moved by a motor 42 and a suitable transmission gearing and feed screw (not shown) connected to the table.

Figure 2:
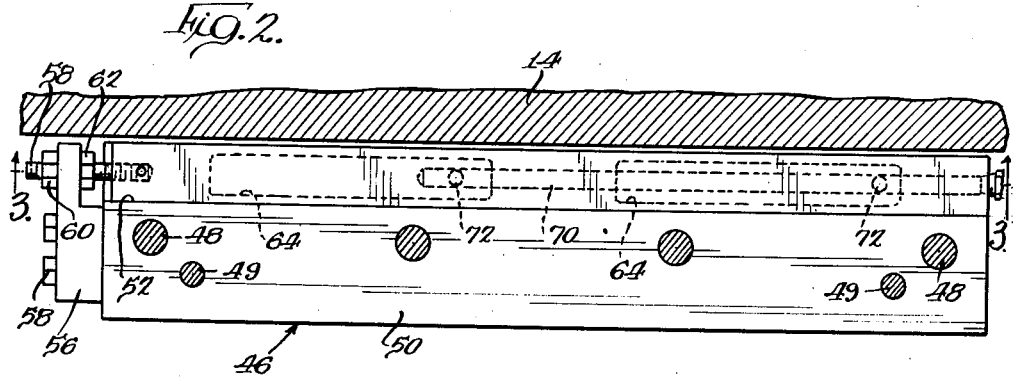
FIG. 2 is a fragmentary plan view partially in section taken substantially along line 2—2 of FIG. 1 looking in the direction of the arrows showing a portion of the improved clamping arrangement.

Table retainer assemblies 44 and 45 suitably secured to the table 30 retain the table securely against the ways 32. Similarly, saddle retainer assemblies such as 46 suitably secured to the saddle 34 by means of screws 48 and positioning pins 49 maintain the saddle against the ways 36. Since the table retainer assemblies and the saddle retainer assemblies are generally similar, only the latter will be described in detail. As best seen in FIGS. 2, 3 and 4, the saddle retainer assembly 46 comprises an elongated retainer body 50 which is generally rectangular in cross section and which includes a recess 52 at the upper inner side thereof generally rectangular in cross section and tapering from left to right with respect to FIG. 3 to receive a cooperating tapered gib 54.

An arm 56 secured to the body 50 by means of screws 58 carries an adjustable screw 58 adjacent the free end thereof, which screw is threaded into the gib. A pair of lock nuts 60 and 62 secure the screw 58 in fixed position relative to the arm 56 so that the gib may be positioned as desired from left to right with respect to FIG. 3 to compensate for slack between the saddle and ways caused by wear over long periods of use.

A pair of cavities 64 of generally rectangular shape are formed on the lower surface of the recess 52. The cavities 64 are closed by a pair of inverted shallow cup-shaped diaphragms 66 which are preferably silver soldered to the body 50 to provide a reliable seal. A longitudinal bore 70 and cross bores 72 form hydraulic connections between a source of hydraulic pressure which will be described later and the cavities 64. The hydraulic pressure to which the cavities 64 are subjected will depend upon the effective areas of the diaphragms and the total clamping force required and in one typical application is in the order of 300 p.s.i. The diaphragms, which are preferably made of a suitable thin flexible metal, having for example in the order of 1/64 inch thickness, are urged against the juxtaposed surfaces of the gib when said pressure is applied in the cavities. It can be seen in FIG. 2 that the bearing surfaces of the diaphragms 66 are substantially enlarged; and, as a result, the 300 p.s.i. hydraulic pressure applied thereto produces a very high clamping force to the gib. This force in turn moves the gib against the way 36 and the way against the adjacent cooperating surface of the saddle 34. In this manner a very high clamping force is provided between the stationary way and the movable saddle whereby movement of the latter is prevented while the hydraulic pressure is applied to the diaphragms. The time required for applying this substantial force is at a minimum because the hydraulic fluid which produces the pressure is normally received in and completely fills the passageway connections between the source and the cavities 64, whereby little movement of fluid is required to vent or pressurize the fluid system. The structure shown and described with respect to FIGS. 2, 3 and 4 for producing a clamping action between a way and an adjacent slide structure, in this case the saddle, is duplicated on the opposite side of the saddle 34 and on either side of the table 30 and the head 20.

A second embodiment of the improved clamping device is shown in FIG. 5 and is illustrated with respect to a machine in which a gib is not provided. Hence the machine tool of FIG. 5 indicated generally by the numeral 90 includes a suitable way 92, a slide 94 and a slide retainer 96. The slide retainer has a cavity 98 which is closed by a diaphragm 100 similar to the diaphragm 66 of FIGS. 2–4. The diaphragm is preferably silver soldered to the periphery of the cavity to seal the cavity. In this embodiment, however, the slide retainer 96 includes a second enlarged cavity 102 within which a wear shoe 104 is received. The wear shoe is a generally rectangular flat element of a suitable material which resists frictional wear upon engagement of the shoe with the way 92. The shoe closely fits within the cavity 102 but is movable in a direction normal to the adjacent surface of the way under the high hydraulic forces in the cavity 98 acting upon the diaphragm 100. The use of the wear shoe has the advantage of protecting the diaphragm 100 from frictional wear in this embodiment in which the diaphragm and the adjacent way are movable relative to each other during the tool positioning operation. The diaphragms 66 and 100 are preferably cup-shaped as illustrated; however, it will be appreciated that they may take other forms such as flat plates.

FIG. 5 illustrates diagrammatically one suitable means for controlling the application of hydraulic fluid pressure to one or more sets of cavities 98 (or 64) for clamping one or more slides such as the saddle, the table, and the head of the drill press of FIG. 1. Depending upon the type of machine and the various machining operations which it can perform, any one or more of the slides may be clamped in their indexed positions during a machining operation. The illustrative hydraulic control means comprises a hydraulic pressurizing and venting system including a three-way valve 110 which is selectively operated by three solenoids 112, one for each slide, under the control of a numerical control system 114 to apply the output pressure of a suitable hydraulic pump 118 to the cavities 98 by way of three flexible hoses 120 (only one being shown) and passageways 122 in the slide retainer 96. The hydraulic system also includes a reservoir or sump 116 which is connected to the inlet of the pump by way of a fluid supply connection 117 and which is connected to the valve 110 by way of a fluid vent connection 119. Preferably the pump is continuously operating and includes means for producing a desired pressure, for example 300 p.s.i., at its outlet; and the valve is in a venting condition when all of the solenoids are de-energized, whereby the output of the pump is vented directly to the reservoir 116. When one of the solenoids 112 is energized by the numerical control system 114 in a manner which will be described below, the valve shuts off the vent connection and the output pressure of the pump 118 is applied to the set of cavities which are controlled by the respective solenoid. The vent connection in the valve 110 may include any one of several well known relief valves which open when the pressure in the valve achieves a predetermined maximum whereupon the excess flow of hydraulic fluid from the pump 118 is vented to the sump or reservoir 116 while the desired pressure is maintained in the valve and the lines to which the valve is connected. The solenoids 112 will be operated in a sequential manner for making pressurized fluid connections to the cavities in their respective slides depending upon which of these elements is to be clamped in its indexed position and depending upon the order in which these elements are directively moved to their indexed positions.

The valve itself or the connections between the valve and the hoses 120 may include very highly restricted passageway sections of well known construction whereby upon the venting of pressure the passageway connections between the valve and the cavities remain substantially filled with the hydraulic fluid even though the pressure has been relieved. The cavities are preferably very shallow and the displacement volume of the passageways is preferably maintained at a minimum so that, in the event of leakage of hydraulic fluid therefrom during venting, the time required to refill the cavities and passageways and to subject them to pressure is minimized.

When the numerical control system 114 energizes one of the solenoids to cause the valve to connect the outlet of the pump 118 to one set of cavities in one of the slides, the full output pressure of the pump is almost immediately applied to the cavities since the pump is continuously operating and therefore producing its maximum pressure and because the fluid connection between the valve and the cavities is substantially filled with the hydraulic fluid at all times, the pressure merely being applied and vented by way of the valve. The three-way valve, the solenoids and the pump may be of conventional construction; and, as is frequently the case, the valve and the pump may be a portion of or mounted directly on the sump.

Three valves, rather than a single three-way valve 110, may be used, each valve being connected to a respective clamping system by a hose 120 and each valve being connected to the pump 118 and the reservoir 116. In this event, each valve will include as an integral part thereof a solenoid 112 which when energized and de-energized respectively permits pressurization and venting of its clamping system. It will be appreciated that the application of the hydraulic fluid pressure to the cavities of the slides may be made by other known automatic and manual hydraulic system techniques.

Typical examples of a numerical control system 114 which may be utilized for controlling a single spindle drill press of the type contemplated in the preferred embodiment are disclosed in the abovesaid Tice application and in the Sangster patent.

Briefly, properly sequenced holes in a control tape are sensed by a tape reader to initiate the selective energization of desired solenoids 112 at the proper time intervals for application of the hydraulic clamping forces to the saddle, table and head as soon as each of the latter is properly positioned under the control of the same tape. For example, the system 114 may first position the saddle and energize the first solenoid 112 to apply pressure to the cavities of the saddle, next position the table and energize the second solenoid to cause hydraulic pressure to be applied to the cavities of the table as well as to those of the saddle, and finally position the head without energizing the third solenoid in preparation for a controlled depth drilling operation during which the head is lowered for engagement of the drill with the work. When the machine operation is completed, the solenoids will be de-energized to vent the pressure in all cavities.

From the foregoing description it will be apparent that the objectives which were claimed for this invention are readily obtained.

While preferred embodiments of the diaphragm clamping device of this invention have been shown and described, it will be apparent that numerous variations and modifications may be made without departing from the underlying principles of this invention. It is therefore desired, by the following claims, to include within the scope of the invention all such modifications and variations by which substantially the results of this invention may be obtained through the use of substantially the same or equivalent means.

What is claimed as new and desired to be secured by United States Letters Patent is:

1. In a machine tool having a pair of elongated elements mounted for relative longitudinal reciprocable movement and provided with faces directly opposing each other, the improvement comprising a clamping device for the elements including elongated cavity means of substantial area in said face of one of the elements, a flexible diaphragm closing the cavity, means for subjecting the cavity to hydraulic fluid pressure to urge the diaphragm outwardly from the cavity, and an elongated wear member interposed between the diaphragm and said face of the other element and urged against said last face directly by the diaphragm in contact therewith when the diaphragm is subjected to hydraulic pressure to prevent relative movement between the elements.

2. In a machine tool having an elongated slide element and means including at least one elongated way element for mounting the slide for reciprocable movement, said elements having opposed faces, the improvement comprising a clamping device for the slide element including elongated cavity means of substantial area in said face of one of the elements, a flexible diaphragm closing the cavity, means for subjecting the cavity to hydraulic fluid pressure to urge the diaphragm outwardly from the cavity, and an elongated wear member interposed between the diaphragm and the other element and urged against said face of the other element by the diaphragm when it is subjected to hydraulic pressure to prevent relative movement between the elements.

3. In a machine tool having a pair of elongated stationary ways and an elongated movable slide member mounted thereon for reciprocable movement along the ways and having portions on opposite sides of one of said ways, the improvement comprising a clamping device for locking the slide member to the ways including an elongated shallow cavity of substantial area in a face of one of said portions of the slide member facing said one of the ways, a thin flexible diaphragm closing the cavity and sealed with respect to the periphery of said cavity, means for subjecting the cavity to hydraulic fluid pressure to urge the diaphragm outwardly from the cavity and toward the way, and an elongated wear element interposed between the diaphragm and the way and urged against the way by direct action of the diaphragm when it is subjected to hydraulic pressure thereby to prevent the slide member from moving relative to said ways.

4. In a machine tool having a pair of elongated stationary ways and an elongated movable slide member mounted thereon for reciprocable movement along the ways, the improvement comprising a clamping device for locking the slide member to the ways including an elongated shallow cavity of substantial area in the slide member facing one of the ways, a thin flexible diaphragm closing the cavity and sealed with respect to the slide member, means for subjecting the cavity to hydraulic fluid pressure to urge the diaphragm outwardly from the cavity and toward the way, a second elongated cavity in the slide contiguous with the first cavity and positioned outwardly thereof, and a wear element located in the second cavity for direct contact on one side with the diaphragm and the other side with the way, and urged against the way by the diaphragm when it is subjected to hydraulic pressure thereby to prevent the slide member from moving on the way.

5. In a machine tool of the type in which means including elongated ways carry elongated tool supporting and work supporting members for reciprocable movement relative to the ways and in which means including a numerical control system move the members to selected positions for action of the tool on the work, the combination with at least one of the members of a positive acting clamping device comprising elongated cavity means of substantial area extending longitudinally of the one member adjacent at least one of the ways supporting the member, a flexible diaphragm having a comparable area closing the cavity means, means including the numerical control system effective upon positioning of the one member to subject the cavity to hydraulic pressure to urge the diaphragm outwardly from the cavity, and a wear element interposed directly between the diaphragm and the one way and urged against the way by the hydraulic force applied to the diaphragm to prevent relative movement between the one member and the way.

6. In a machine tool of the type in which means including a pair of elongated ways carry an elongated slide for reciprocable movement relative to the ways, the combination with the slide of a positive acting clamping device comprising a pair of elongated slide retainers secured to the slide adjacent the ways, means defining an elongated tapered recess in each retainer parallel with and facing the adjacent way, a cooperating tapered gib received in each recess and carried by the respective retainer for sliding engagement with the adjacent way, elongated cavity means of substantial area in each retainer facing the gib, a flexible diaphragm having a substantial area closing each cavity means, and means for subjecting each cavity to hydraulic pressure to urge the diaphragms into contact with the gibs and the gibs into contact with the ways to prevent relative movement between the slide and ways.

7. In a machine tool of the type in which means including elongated ways support a saddle member for reciprocable movement in one direction, in which means including elongated ways carried by the saddle member support a work supporting table member for reciprocable movement in a direction transverse to that of the saddle member, in which means including elongated ways support a tool supporting head member for reciprocable movement in a third direction and in which means are provided for moving the saddle, table and head members to selected positions for action of the tool on the work, the combination with each member of a positive acting clamping device comprising elongated cavity means of substantial area and arranged longitudinally in the member adjacent at least one of the ways supporting the member, a flexible diaphragm having a comparable area closing the cavity means, means subjecting the cavity to hydraulic pressure to urge the diaphragm outwardly from the cavity, and an elongated wear element interposed between the diaphragm and the one way and urged against the way by the hydraulic force applied to the diaphragm to prevent relative movement between the member and way.

8. In a machine tool of the type in which means including elongated ways support a saddle member for reciprocable movement in one direction, in which means including elongated ways carried by the saddle member support a work supporting table member for reciprocable movement in a direction transverse to that of the saddle member, in which means including elongated ways support a tool supporting head member for reciprocable movement in a third direction and in which means including a numerical control system are provided for moving the saddle, table and head members to selected positions for action of the tool on the work, the combination with at least one of the members of a positive acting clamping device comprising elongated cavity means of substantial area in the one member longitudinally thereof and adjacent at least one of the ways supporting the member, a flexible diaphragm closing the entire cavity means, means including the numerical control system effective upon positioning of the one member to subject the cavity to hydraulic pressure to urge the diaphragm outwardly from the cavity, and a wear element constituting the only element interposed between the diaphragm and the adjacent way and urged directly against the way by the hydraulic force applied to the diaphragm which directly engages it to prevent relative movement between the one member and the adjacent way.

9. In a machine tool having a pair of elongated elements mounted for relative reciprocable movement, the improvement comprising a clamping device for the elements including elongated cavity means of substantial area extending longitudinally in one of the elements facing the other element, a member closing the cavity, movable toward and away from the other element and directly engageable therewith, and means for subjecting the cavity to fluid pressure to urge the member outwardly from the cavity to contact the other element to cause a clamping action between the elements.

10. In a machine tool of the type in which means including elongated ways carry elongated tool supporting and work supporting members for reciprocable movement relative to the ways and in which means including a numerical control system move the members to selected positions for action of the tool on the work, the combination with at least one of the members of a positive acting clamping device comprising elongated cavity means of substantial area in the one member longitudinally thereof and adjacent at least one of the ways supporting the member, a flexible diaphragm closing the cavity means and having an area coextensive therewith, and means including the numerical control system effective upon positioning of the one member to subject the cavity to hydraulic pressure to urge the diaphragm outwardly from the cavity to prevent relative movement between the one member and the one way.

References Cited in the file of this patent

UNITED STATES PATENTS 2,355,677   Ransome _____ Aug. 15, 1944

FOREIGN PATENTS 217,217   Australia _____ July 25, 1958